(12) United States Patent
Bruna Estrach

(10) Patent No.: US 9,699,475 B2
(45) Date of Patent: Jul. 4, 2017

(54) VIDEO SEQUENCE ANALYSIS FOR ROBUST MOTION ESTIMATION

(75) Inventor: Joan Bruna Estrach, Paris (FR)

(73) Assignee: QUALCOMM Incorporated, San Diego, CA (US)

( * ) Notice: Subject to any disclaimer, the term of this patent is extended or adjusted under 35 U.S.C. 154(b) by 1643 days.

(21) Appl. No.: 13/148,876

(22) PCT Filed: Jan. 22, 2010

(86) PCT No.: PCT/EP2010/050734
§ 371 (c)(1),
(2), (4) Date: Aug. 10, 2011

(87) PCT Pub. No.: WO2010/091934
PCT Pub. Date: Aug. 19, 2010

(65) Prior Publication Data
US 2011/0310304 A1    Dec. 22, 2011

Related U.S. Application Data

(60) Provisional application No. 61/151,955, filed on Feb. 12, 2009.

(51) Int. Cl.
*H04N 5/14* (2006.01)
*H04N 19/57* (2014.01)
(Continued)

(52) U.S. Cl.
CPC ............. *H04N 19/57* (2014.11); *G06T 7/238* (2017.01); *H04N 19/537* (2014.11);
(Continued)

(58) Field of Classification Search
CPC ........ G06T 2207/20021; G06T 7/2026; H04N 19/00648; H04N 19/00678
See application file for complete search history.

(56) References Cited

U.S. PATENT DOCUMENTS

| 4,890,160 A | 12/1989 | Thomas |
| 7,010,039 B2 | 3/2006 | De Haan et al. |
| 2011/0311163 A1 | 12/2011 | Bruna Estrach |

FOREIGN PATENT DOCUMENTS

| EP | 1734767 A1 | 12/2006 |
| EP | 1855474 A1 | 11/2007 |

(Continued)

OTHER PUBLICATIONS

Braspenning et al. "Efficient Motion Estimation with Content-Adaptive Resolution," International Symposium on Consumer Electronics, Sep. 23, 2002.*

(Continued)

*Primary Examiner* — Andy Rao
*Assistant Examiner* — Tyler Edwards

(57) ABSTRACT

The method of analyzing a video sequence for motion estimation comprises computing first matching energies for individual local displacements between frames of the video sequence using a first window around a pixel, and determining a minimum of the first matching energies. Second matching energies for motion configurations each including a plurality of local displacements between frames of the video sequence using the first window around said pixel are also computed. If none of the second matching energies satisfies a comparison criterion with the minimum of the first matching energies, a local displacement providing the minimum of the first matching energies is associated with said pixel. On the other hand, if at least one motion configuration provides a second matching energy satisfying the comparison criterion with the minimum of the first matching energies, a group of local displacements is formed based on local displacements of said at least one motion configuration, and third matching energies are computed for the individual local displacements of that group using a second window smaller than the first window. A local displacement of the
(Continued)

group for which the third matching energy is minimal can then be associated with the pixel.

15 Claims, 3 Drawing Sheets

(51) Int. Cl.
  *H04N 19/537* (2014.01)
  *H04N 19/553* (2014.01)
  *G06T 7/238* (2017.01)
(52) U.S. Cl.
  CPC .. *H04N 19/553* (2014.11); *G06T 2207/10016* (2013.01); *G06T 2207/20021* (2013.01)

(56) References Cited

FOREIGN PATENT DOCUMENTS

| WO | 9922520 | A2 | 5/1999 |
|----|---------|----|--------|
| WO | 2004039074 | A1 | 5/2004 |
| WO | 2005022922 | A1 | 3/2005 |
| WO | 2005027525 | A1 | 3/2005 |
| WO | 2009053780 | A2 | 4/2009 |
| WO | 2009087493 | A1 | 7/2009 |
| WO | 2010091930 | A2 | 8/2010 |
| WO | 2010091934 | A1 | 8/2010 |

OTHER PUBLICATIONS

Braspenning et al., "Efficient Motion Estimation with Content-Adaptive Resolution," Sep. 23, 2002, pp. E29-E34.
International Preliminary Report on Patentability dated Aug. 16, 2011 for International Application No. PCT/EP2010/050734.
Kim et al., "Motion-adaptive alternate gamma drive for flicker-free motion-blur reduction in 100/120-Hz LCD TV," Journal of the SID, 2009, vol. 17/3, pp. 203-212.
Mertens et al., "Motion vector field improvement for picture rate conversion with reduced halo," Proc. SPIE, 2001, vol. 4310, pp. 352-362.
Silveira et al., "Variable Block Sized Motion Segmentation for Video Coding," 1997 IEEE International Symposium on Circuits and System, Jun. 9-12, 1997, Hong Kong, pp. 1293-1296.
Written Opinion of the International Searching Authority dated Aug. 12, 2011 for International Application No. PCT/EP2010/050734.

* cited by examiner

VIDEO SEQUENCE ANALYSIS FOR ROBUST MOTION ESTIMATION

BACKGROUND OF THE INVENTION

The present invention relates to digital video processing, and more particularly to the analysis of a video sequence for motion estimation. Motion estimation looks for temporal correlations in a video sequence to associate directions of regularity to pixels of a frame according to the apparent movement of objects in the video sequence. It can be useful, for example, in the field of super-resolution video processing. Super-resolution video processing methods are used in various applications including super-resolution interpolation (such as frame-rate conversion, super-resolution video scaling and deinterlacing) and reduction of compression artifacts and/or noise.

In digital systems, a video sequence is typically represented as an array of pixel values $I_t(x)$ where t is an integer time index, and x is a 2-dimensional integer index $(x_1, x_2)$ representing the position of a pixel in the image. The pixel values can for example be single numbers (e.g. gray scale values), or triplets representing color coordinates in a color space (such as RGB, YUV, YCbCr, etc.).

In the block matching technique, estimating the motion at a pixel $x=(x_1, x_2)$ and at time $t+\alpha$ ($0 \leq \alpha \leq 1$) typically consists in identifying the displacement $v=(v_1, v_2)$, also referred to as motion vector, or direction of regularity, which minimizes a matching energy $E_{x,t+\alpha}(v)$ over a spatial window W which is a set of offsets $d=(d_1, d_2)$. The form of the matching energy can be:

$$E_{x,t+\alpha}(v) = \sum_{d \in W} g_{x+d,t+\alpha}(v) \text{ where} \quad (1)$$

$$g_{x+d,t+\alpha}(v) = f[I_t(x + d - \alpha \cdot v) - I_{t+1}(x + d + (1 - \alpha) \cdot v)] \quad (2)$$

and f is some measure function. For example, the so-called $L_1$-energy is defined by $f[z]=|z|$ and the so-called $L_2$-energy, or Euclidean distance, is defined by $f[z]=z^2$. In the optimization process, the displacements $v=(v_1, v_2)$ are selected from a limited set $\Omega$ of candidate displacements in order to reduce the computation load.

The estimation of temporal correlation in a video sequence requires regularization by doing assumptions on the spatial regularity of the motion field. It is assumed for example that the vector field is uniform over a spatial window. Such assumption is valid where the motion is uniform, but not in zones where motion transitions take place, i.e. close to occlusion/disocclusion boundaries. In such cases, a naive spatial regularization produces inaccurate estimates yielding artifacts such as halo.

FIG. 1 shows part of an image with a foreground object F and a background object B having an occlusion boundary Z between them. For example, object F moves towards object B so that part of object B visible in frame t is covered by part of object F in frame t+1. Similar considerations apply to disocclusions, in which part of a background object masked by a foreground object in frame t is uncovered in frame t+1. Using a spatial window W, a displacement can be easily identified at pixels a and b shown in FIG. 1 because the window W centered on either a or b is fully contained in one of the moving objects and the speed of the objects are generally uniform over such window. However a pixel such as c, i.e. close to the occlusion boundary Z, may give rise to ambiguities because the motion is not uniform over the window W centered on c.

In the design of a motion estimation system, there is a tradeoff in the choice of the size of the spatial windows. With smaller windows (like window W' shown around pixel c in FIG. 1), the areas where motion discontinuities have a negative impact on the quality of the estimation are smaller. However smaller windows are not without problems since they provide less stable measurements and can thus introduce noise.

There is a need for a technique that would combine the robustness of motion estimation obtained with large spatial windows and the improved estimations made with smaller windows near occlusion boundaries.

SUMMARY OF THE INVENTION

A method of analyzing a video sequence as proposed herein comprises:
  computing first matching energies for individual local displacements between frames of the video sequence using a first window around a pixel;
  determining a minimum of the first matching energies;
  computing second matching energies for motion configurations each including a plurality of local displacements between frames of the video sequence using the first window around said pixel;
  if none of the second matching energies satisfies a comparison criterion with the minimum of the first matching energies, associating with said pixel a local displacement providing the minimum of the first matching energies;
  if at least one motion configuration provides a second matching energy satisfying the comparison criterion with the minimum of the first matching energies:
    forming a group of local displacements based on local displacements of said at least one motion configuration;
    computing third matching energies for the individual local displacements of said group between frames of the video sequence using a second window around said pixel, the second window being smaller than the first window;
    associating with said pixel a local displacement of said group for which the third matching energy is minimal.

Multiple displacement candidates are tested in the window positioned on each pixel. If it turns out that the minimization of the matching energy is much more efficient for multiple displacement candidates than for individual displacement candidates, a second optimization is performed to select a single displacement using a smaller matching window to reduce the risk of false detection. A refinement of the estimation near object boundaries is thus achieved without affecting the robustness of the estimation in other areas of the video frames.

In an embodiment, the group of local displacements includes the local displacements of at least one motion configuration satisfying the comparison criterion with the minimum of the first matching energies. It can further include displacements satisfying proximity conditions with the local displacements of at least one motion configuration satisfying the comparison criterion with the minimum of the first matching energies. If desired, the size of the group can be limited by including the local displacements of at most L motion configurations satisfying the comparison criterion with the minimum of the first matching energies, where L is a predefined number.

An embodiment of the method further comprises a frame level analysis after having associated respective local displacements with pixels of a first frame. The frame level analysis provides the motion configurations for processing pixels of a second frame following the first frame.

In particular, the frame level analysis may comprise initializing a two-dimensional histogram for pairs of displacements of a set of candidate displacements and, for each one of a plurality of pixels of the first frame:
  computing a respective one-dimensional histogram indicating how many times each displacement of the candidate set was associated with other pixels located in a vicinity of said one of the plurality of pixels;
  selecting two displacements for which the respective one-dimensional histogram indicates the largest numbers; and
  updating a value of the two-dimensional histogram for the pair of displacements corresponding to the two selected displacements; and
  selecting pairs of displacements of the candidate set to define respective motion configurations, the selected pairs providing the largest values of the two-dimensional histogram.

Another aspect of the invention relates to a video processor, comprising:
  a first computation module for computing first matching energies for individual local displacements between frames of the video sequence using a first window around a pixel;
  a first minimization module for determining a minimum of the first matching energies;
  a second computation module for computing second matching energies for motion configurations each including a plurality of local displacements between frames of the video sequence using the first window around said pixel;
  a comparison module for verifying a comparison criterion between the second matching energies and the minimum of the first matching energies;
  a third computation module for computing third matching energies for individual local displacements of a group of local displacements between frames of the video sequence using a second window around said pixel if at least one motion configuration provides a second matching energy satisfying the comparison criterion with the minimum of the first matching energies, the second window being smaller than the first window, the group of local displacements being based on local displacements of said at least one motion configuration;
  an output for associating with said pixel a local displacement providing the minimum of the first matching energies if none of the second matching energies satisfies the comparison criterion with the minimum of the first matching energies and for associating with said pixel a local displacement of said group for which the third matching energy is minimal if at least one of the second matching energies satisfies the comparison criterion with the minimum of the first matching energies.

BRIEF DESCRIPTION THE DRAWINGS

DESCRIPTION OF PREFERRED EMBODIMENTS

Figure 2:
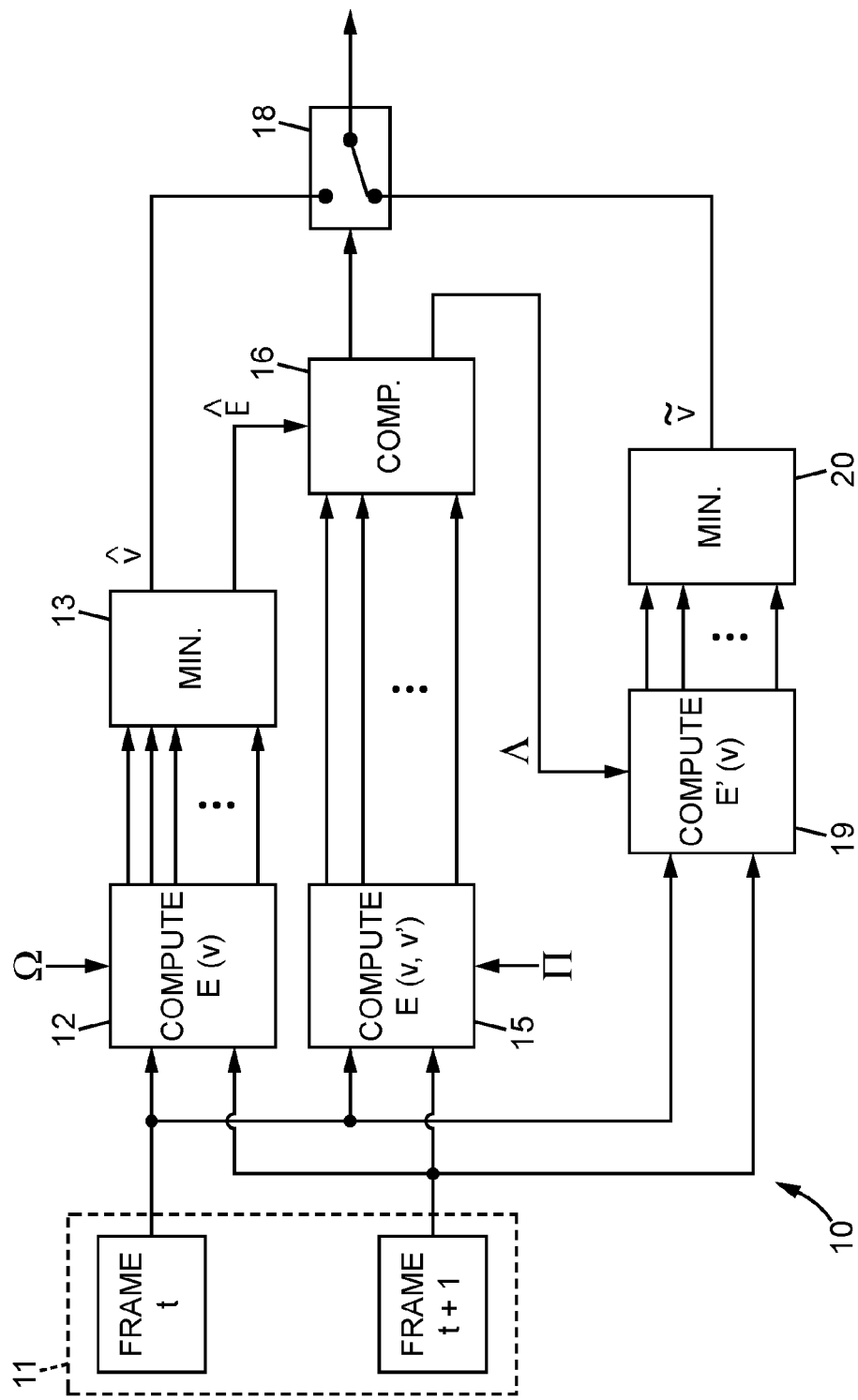
FIG. 2 is a block diagram showing components of an embodiment of a video processor for analyzing a video sequence at the pixel level.

FIG. 2 shows a processor 10 for analyzing a video sequence to perform motion estimation. It cooperates with a buffer 11 which contains pixel values of two consecutive frames, t and t+1, of the video sequence. When processing a given pixel $x=(x_1, x_2)$, the processors needs to have access to a context of pixels around pixel x in frames t and t+1. This context is stored in buffer 11 which may also contain other pixels of the two frames depending on the overall design of the video processor. For example, if the pixels are processed in the raster order, i.e. each frame full line by full line, and each line of a frame pixel by pixel from left to right, the pixels values stored in buffer 11 may correspond to a stripe of a number of adjacent lines spanning the whole width of the frames.

The motion estimation is performed with respect to an instant $t+\alpha$ with $0 \leq \alpha \leq 1$. The relevant values of $\alpha$ depend on the application. The value $\alpha=0$ can be suitable for applications like scaling, de-noising, etc., while $\alpha>0$ is useful for frame rate conversion in which interpolation is used to generate frames at intermediate times.

In accordance with the block matching principle, a module 12 of the processor 10 computes, for each pixel x, matching energies $E(v)=E_{x,t+\alpha}(v)$ according to formulas (1) and (2) above, using offsets d in a spatial window W around pixel x. The local displacements $v=(v_1, v_2)$ for which E(v) is calculated are those of a limited set $\Omega$ of candidate displacements in order to reduce the computation load. A suitable way of determining this set of candidate displacements $\Omega$ is described in WO 2009/087493. Then a minimization module 13 selects the local displacement $\hat{v}$ of $\Omega$ which minimizes the matching energy E(v) for pixel x, i.e.

$$\hat{v} = \operatorname*{Argmin}_{v \in \Omega}(E(v)) \text{ and } \hat{E} = \operatorname*{Min}_{v \in \Omega}(E(v)).$$

Figure 1:
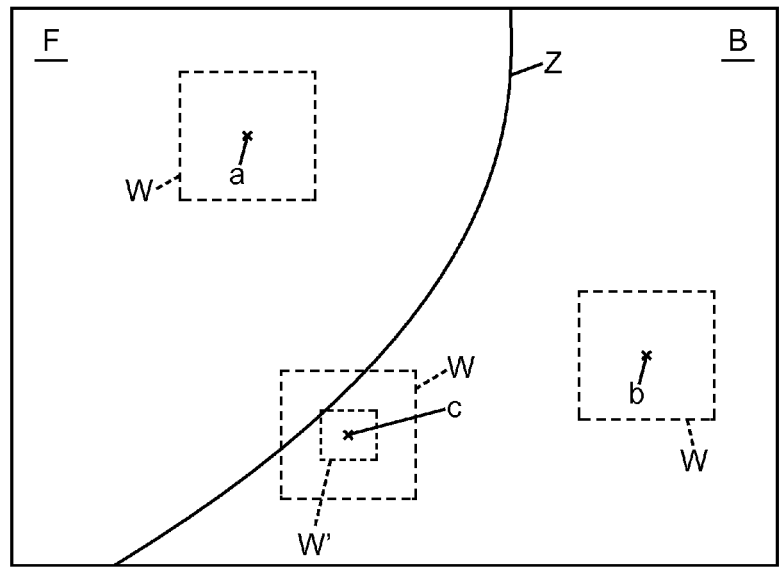
FIG. 1 is a diagram illustrating the block matching technique for analyzing a video sequence.

As discussed above with reference to FIG. 1, the outcome $\hat{v}$ of the minimization process of modules 12, 13 is fairly reliable in non-ambiguous areas, typically away from occlusion boundaries (pixels a, b). On the other hand, there can be problems near occlusion boundaries Z. For example, pixel c of FIG. 1, to which a displacement related to the speed of the background object B should be assigned, may instead be assigned a displacement related to the speed of the foreground object F if the foreground object F is locally brighter or more textured than the background object B. This causes artifacts like halo in the processed video.

In order to resolve such ambiguities, the processor 10 has a module 15 for computing other matching energies E(v,v') for respective motion configurations of a set Π of motion configurations. Each "motion configuration" includes a plurality of local displacements which can be constrained to be elements of the set $\Omega$. In the following, a motion configuration is made of two local displacements v, v' of $\Omega$. So the matching energies E(v,v') computed by module 15 can be referred to as pairwise matching energies. Ways of determining the relevant set Π of motion configurations (v, v') are discussed below with reference to FIGS. 3-4.

A suitable expression of the pairwise matching energy $E(v,v')=E_{x,t+\alpha}(v,v')$ for a motion configuration (v, v') is $$E(v, v') = \sum_{d \in W} \min\{g_{x+d,t+\alpha}(v); g_{x+d,t+\alpha}(v')\} \quad (3)$$

with $g_{x+d,t+\alpha}(v)$ as defined in (2). The minimum in the sum (3) is readily extended to more than two displacements if the set Π includes one or more configuration with more than two displacements.

A comparator 16 checks the pairwise matching energies E(v,v') computed by module 15 with respect to the optimum individual matching energy $\hat{E}$ found by the minimization module 13. If none of the pairwise matching energies E(v,v') is significantly smaller than $\hat{E}$, the probability is high that the window W centered on the pixel being processed is fully contained in one of the objects visible in both frames t and t+1. In this case (e.g., pixel a or b in FIG. 1), the comparator 16 controls the output of the pixel-level processing to associate the local displacement $\hat{v}$ determined by module 13 with the pixel x being processed, as illustrated diagrammatically by the switch 18 in FIG. 2.

Else, if one or more of the pairwise matching energies E(v,v') is significantly smaller than $\hat{E}$, the current pixel may be close to an occlusion boundary. In this case (e.g., pixel c in FIG. 1), a group Λ of local displacements is determined for computing other matching energies $E'(v)=E'_{x,t+\alpha}(v)$ in a module 19, and another minimization module 20 is used to select the displacement $\tilde{v}$ of Λ which yields the smallest matching energy E'(v), i.e.

$$\tilde{v} = \underset{v \in \Lambda}{\mathrm{Argmin}}(E'(v)).$$

The selected displacement $\tilde{v}$ is output by the switch 18 to be associated with the current pixel x.

The matching energies E'(v) are computed by module 19 using a matching window W', positioned around the current pixel x, which is smaller than the window W used in computation modules 12 and 15. By way of non-limiting example, the large window W covers about 25×25 while the small window W' covers about 10×10 pixels. The expression of the matching energy E'(v) for a candidate displacement v of Λ is then:

$$E'(v) = E'_{x,t+\alpha}(v) = \sum_{d \in W'} g_{x+d,t+\alpha}(v)$$

The group Λ is made of local displacements v which belong to at least one motion configuration identified by comparator 16 as having a pairwise matching energy E(v,v') significantly smaller than $\hat{E}$. The expression "significantly smaller" corresponds to a comparison criterion, checked by comparator 16, meaning that the further minimization of the matching energy afforded by the pixel-by-pixel minima in the sum (3) is so important, when two displacements v, v' are considered instead of one, that the current pixel is most probably located near an occlusion/disocclusion boundary Z. In other words, the window W centered on the current pixel probably overlaps an occlusion/disocclusion boundary Z.

For example, the comparison criterion can be expressed as $E'(v,v') \leq A_2 \cdot \hat{E} + A_3$, where $A_2$ and $A_3$ are numbers such that $0 < A_2 < 1$ and $A_3 \leq 0$.

Alternatively, the comparison criterion checked by comparator 16 includes another test to eliminate motion configurations (v, v') which do not give sufficiently low values of the pairwise matching energy E(v,v'). The comparison criterion can then be $$\begin{cases} E'(v, v') \leq A_2 \cdot \hat{E} + A_3 \\ E'(v, v') \leq A_1. \end{cases}$$

It is also possible to limit the number of local displacements taken in group Λ. For example, we can take the local displacements of at most L motion configurations in Λ, namely the L motion configurations which yield the lowest matching energies E(v,v'). In practice, low values of L, like L=1 or L=2, can be sufficient.

On the other hand, it can be useful to augment the group Λ of candidate displacements by adding displacements that satisfy proximity conditions with displacements already in Λ. This is useful when the number of motion configurations in Π is small compared to the number of candidate displacements in Ω.

For example, if we take L=2, Λ has two, three or four displacement vectors $v^q$ (q=1, . . . , Q with 2≤Q≤4) which belong to motion configuration(s) of Π. The group Λ is then augmented to include further displacement vectors "close" to each $v^q$. The "proximity condition" is assessed using a standard metric between vectors, with a threshold corresponding to, e.g., one or two pixels in each direction of the frames. Optionally, "close" vectors admitted in Λ may be filtered to eliminate vectors which are not in Ω.

It is also possible to include in Λ the displacement $\hat{v}$ which was determined by module 13 as the best individual candidate in Ω.

Frame level processing is performed to determine the set Π of motion configurations (v, v') to be used by module 15 when processing the pixels of a subsequent frame of the video sequence. Once the pixels of a frame have been processed to be assigned respective displacements as described above, the set Π is obtained by accumulating statistics on the outcome of the local selection process.

The local selection process associates with each pixel x of a frame a respective displacement (output of module 13 or 20 of FIG. 2), which is noted v[x] in the following. Also, the displacement vectors of Ω are noted $v_1, v_2, \ldots, v_J$, where J is the number of displacements in Ω.

Figure 3:
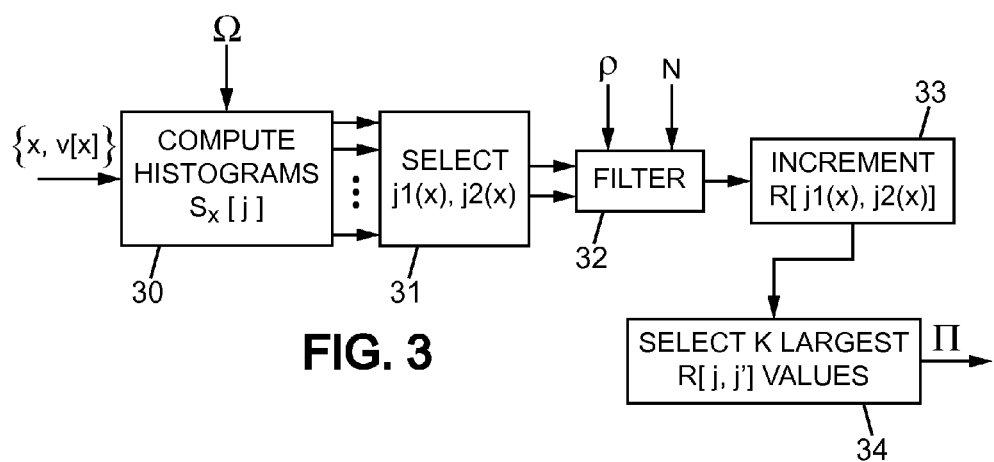
FIG. 3 is a block diagram showing components of an embodiment of a video processor for analyzing a video sequence at the frame level.

For each j=1, 2, . . . , J and each pixel x, a one-dimensional histogram of occurrence of the elements of Ω associated with pixels in the vicinity of the pixel x is determined by a module 30 shown in FIG. 3. The histogram values $S_x[j]$ are:

$$S_x[j] = \sum_{\substack{z \in Y \\ v[x+z]=v_j}} 1$$

where Y is a window defined as a set of offsets. Window Y is for example the same as W as used in module 15. Different window sizes are also possible. In the following, we note $Y_X$ the window Y centered on a pixel x, namely $Y_X=\{x+z|z\in Y\}$.

For each pixel x, the two displacements $v_{j1(x)}$, $v_{j2(x)}$ of maximal occurrence in the vicinity of x are selected by a module 31. That is, j1(x) and j2(x) are the two values of j for which $S_X[j]$ is largest. They are used in a module 33 to update a two-dimensional histogram R whose entries are integer pairs [j, j'] in $\{1, 2, \ldots, J\} \times \{1, 2, \ldots, J\}$ with j<j'.

Figure 4:
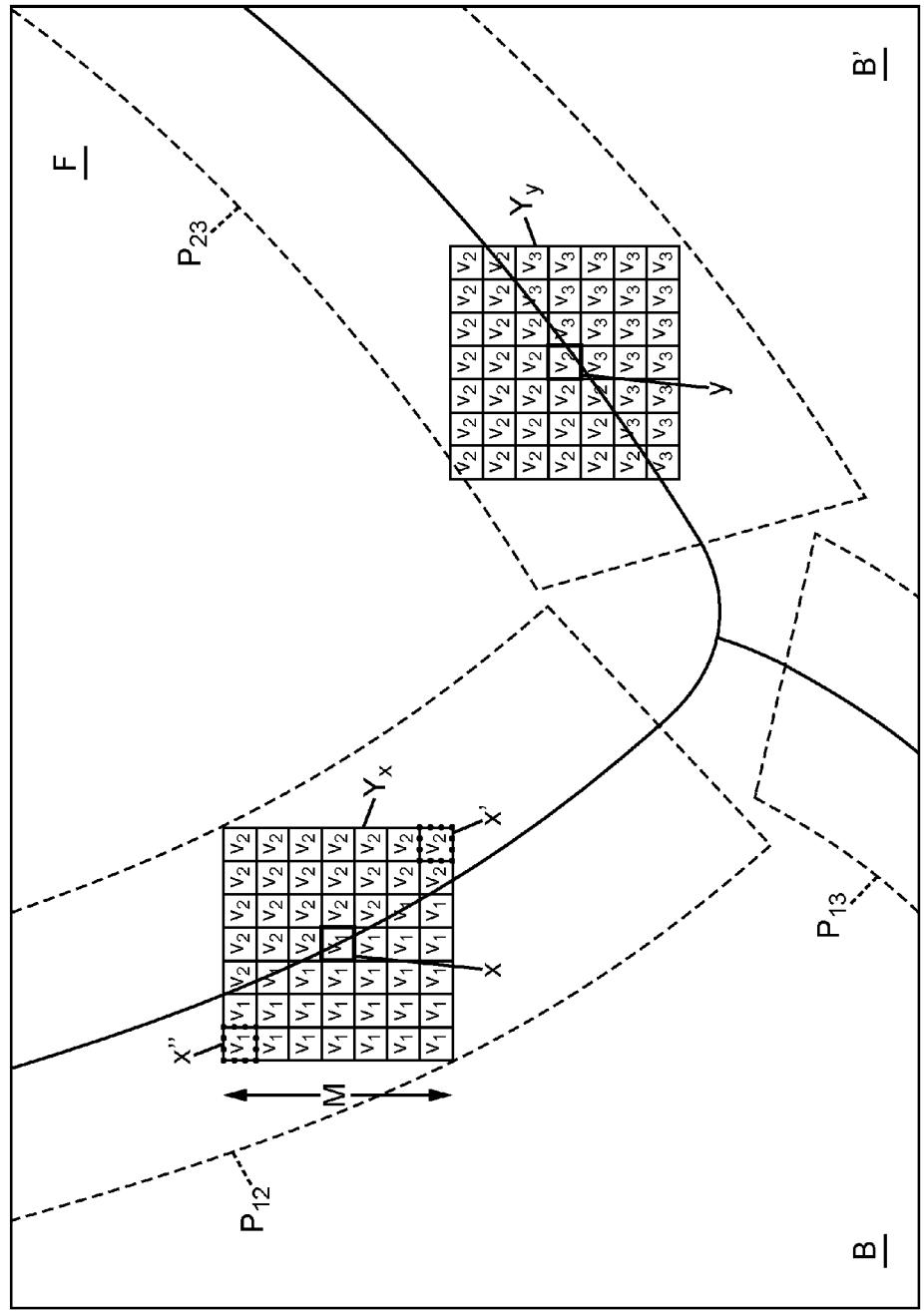
FIG. 4 is a diagram illustrating the operation of the components of FIG. 3 on an exemplary frame.

This is illustrated in FIG. 4 for two pixels x, y in a case where the video contains three objects B, B', F having respective speeds $v_1$, $v_2$, $v_3$. For the first pixel x close to the boundary between objects B and F, the two displacements $v_1$ and $v_2$ are selected by module 31 in the vicinity of x corresponding to window $Y_X$ (j1(x)=1, j2(x)=2), while for the second pixel y close to the boundary between objects B' and F, the two displacements $v_2$ and $v_3$ are selected by module 31 in its vicinity $Y_y$ (j1(y)=2, j2(y)=3). In the example of FIG. 4, pixels of region $P_{12}$ will contribute to the histogram value R[1, 2], pixels of region $P_{13}$ will contribute to the histogram value R[1, 3] and pixels of region $P_{23}$ will contribute to the histogram value R[2, 3].

At the start of the frame, the counts in the histogram R are reset to 0, and for each pixel x, the two selected displacements $v_{j1(x)}$, $v_{j2(x)}$ are used in module 33 to update the histogram value R[j1(x), j2(x)]. The update can be done according to the following formula:

$$R[j1(x),j2(x)] \leftarrow R[j1(x),j2(x)] + \rho(S_X[j1(x)]) \times \rho(S_X[j2(x)]) \times N(j1(x),j2(x))$$

where: $\rho$ is a thresholding operator used to avoid that displacement values scarcely represented in the window $Y_X$ contribute to the histogram R. For example $\rho(s)=0$ is s is smaller than 10% or 20% of the number of pixels covered by window Y, and $\rho(s)=1$ else. Hence, the value R[j1(x), j2(x)] of the two-dimensional histogram is incremented by an amount which is zero if one or both of the largest numbers $S_X[j1(x)]$, $S_X[j2(x)]$ indicated in $S_X[j]$ for the current pixel is below a predefined value;

N is an activation function used to prevent the selection of pairs (j, j') where the directions $v_j$ and $v_{j'}$ are too close one to another. N is thus defined, e.g., as N(j, j')=0 if $\|v_j - v_{j'}\| < \epsilon$ and N(j, j')=1 else, where $\epsilon$ is a threshold corresponding to a typical spacing of a few pixels. Hence, the value R[j1(x), j2(x)] of the two-dimensional histogram is incremented by an amount which is zero if the two displacements of the pair $v_{j1(x)}$, $v_{j2(x)}$ are within a predefined distance $\epsilon$ from each other.

The thresholding operator $\rho$ avoids contributions to R[j, j'] from pixels located relatively far from object boundaries in the video sequence (for example in margins of regions $P_{12}$, $P_{13}$ and $P_{23}$ shown in FIG. 4). It reduces the estimation noise. In the implementation illustrated in FIG. 3, the thresholding operator $\rho$ and the activation function N are applied by a filter 32 upstream of the module 33 which increments R[j1(x), j2(x)] by one unit for each pixel x such that $\rho(S_X[j1(x)])=\rho(S_X[j2(x)])=N(j1(x), j2(x))=1$.

Once all the pixels of a frame have been processed in modules 30-33, a module 34 selects the K pairs $(v_j, v_{j'})$ corresponding to the K largest values in the histogram R[j, j'], where K is a predefined number equal to a fixed number of elements in the set Π, e.g. K in the range of 4 to 10 pairs. The K pairs $(v_j, v_{j'})$ constitute the set Π of motion configurations supplied to module 15 of FIG. 2 for processing the pixels of the next frame. Alternatively, a variable number of pairs (at most K) can be selected in module 34 by further imposing that each selected pair $(v_j, v_{j'})$ has a corresponding histogram value R[j, j'] larger than a given threshold.

It will be appreciated that the frame level analysis by the components shown in FIG. 3 can be performed either after all the pixels x of the current frame were assigned respective displacements $v_X$, or progressively as the pixels x are being processed.

In the latter case, memory space is provided in the video processor for buffers all initialized with zeroes at the beginning of the frame, namely a first buffer for containing the array of accumulated values of R[j, j'] and a second buffer for containing the histograms $S_X[j]$ which will be impacted by the outcome v[x] of the optimization process for the current pixel x. These are the histograms $S_Z[j]$ relating to the pixels z for which the window $Y_X$ reaches the current pixel x, namely to the pixels z located within the window $Y_X$ centered on the current pixel x. Since the pixels x are typically handled in the raster order, the second buffer is conveniently extended to contain the histograms $S_Z[j]$ (j=0, 1, ..., J) for each pixel z in a stripe covering the full width of the video frames over a number M of lines corresponding to the number of pixels of the window Y along the vertical dimension. Once the best displacement v[x] is determined for the current pixel, such as x in FIG. 4:

a new histogram $S_{X'}[j]$ (j=0, 1, ..., J) is initialized with zeroes for the pixel x' located at the bottom right corner of the window $Y_X$ as indicated in FIG. 4;

the module 30 increments the histograms of all the pixels z within the window $Y_X$ centered on x;

the module 31 performs the selection of j1(x''), j2(x'') for the pixel x'' located at the top left corner of the window $Y_X$ as indicated in FIG. 4, whereupon the modules 32-33 update R[j1(x''), j2(x'')];

the histogram $S_{X''}[j]$ is discarded to be replaced in the second buffer by the new histogram $S_{X'}[j]$.

Once all the pixels of the frame have been processed, the module 34 can finally proceed with the selection of the K displacement pairs of Π for the next frame.

If it is desired to reduce the buffer size requirement, it is possible to compute the histograms $S_X[j]$ only for some of the pixels of the frame without losing too much statistical reliability for selecting the pairs of displacements. For example only the pixels x having even line and column indexes in the pixel array of the video frames may be retained for computation of the one-dimensional histograms $S_X[j]$.

While a detailed description of exemplary embodiments of the invention has been given above, various alternative, modifications, and equivalents will be apparent to those skilled in the art. Therefore the above description should not be taken as limiting the scope of the invention which is defined by the appended claims.

The invention claimed is:

1. A method of analyzing a video sequence, comprising:
   computing first matching energies for individual local displacements between frames of the video sequence using a first window around a pixel;
   determining a minimum of the first matching energies;
   computing second matching energies, each second matching energy being a function of a set of a plurality of local displacements between frames of the video sequence using the first window around said pixel;
   if none of the second matching energies satisfies a comparison criterion with the minimum of the first matching energies, associating with said pixel a local displacement providing the minimum of the first matching energies;

if at least one set in said sets provides a second matching energy satisfying the comparison criterion with the minimum of the first matching energies:
  forming a group of local displacements based on local displacements of said at least one set;
  computing third matching energies for the individual local displacements of said group between frames of the video sequence using a second window around said pixel, the second window being smaller than the first window;
  associating with said pixel a local displacement of said group for which the third matching energy is minimal.

2. The method as claimed in claim 1, wherein said group of local displacements includes the local displacements of at least one set in said sets satisfying the comparison criterion with the minimum of the first matching energies.

3. The method as claimed in claim 2, wherein said group of local displacements further includes displacements satisfying proximity conditions with the local displacements of at least one set in said sets satisfying the comparison criterion with the minimum of the first matching energies.

4. The method as claimed in claim 2, wherein said group of local displacements includes the local displacements of at most L sets satisfying the comparison criterion with the minimum of the first matching energies, where L is a predefined number.

5. The method as claimed in claim 1, further comprising a frame level analysis after having associated respective local displacements with pixels of a first frame, the frame level analysis providing the sets for processing pixels of a second frame following the first frame.

6. The method as claimed in claim 5, wherein the frame level analysis comprises:
  initializing a two-dimensional histogram for pairs of displacements of a set of candidate displacements;
  for each one of a plurality of pixels of the first frame:
  computing a respective one-dimensional histogram indicating how many times each displacement of the candidate set was associated with other pixels located in a vicinity of said one of the plurality of pixels;
  selecting two displacements for which the respective one-dimensional histogram indicates the largest numbers; and
  updating a value of the two-dimensional histogram for the pair of displacements corresponding to the two selected displacements; and
  selecting pairs of displacements of the candidate set to define respective sets, whereby the selected pairs provide the largest values of the two-dimensional histogram.

7. The method as claimed in claim 6, wherein the updating of the value of the two-dimensional histogram for the pair of displacements corresponding to the two selected displacements for a pixel comprises incrementing said value of the two-dimensional histogram by an amount, wherein the amount is zero if at least one of said largest numbers indicated in the one-dimensional histogram for said pixel is below a predefined value.

8. The method as claimed in claim 6, wherein the updating of the value of the two-dimensional histogram for the pair of displacements corresponding to the two selected displacements for a pixel comprises incrementing said value of the two-dimensional histogram by an amount, wherein the amount is zero if the two displacements of said pair are within a predefined distance from each other.

9. The method as claimed in claim 6, wherein the pixels are handled in a raster order in the frame level analysis and the one-dimensional histograms are stored in a buffer for pixels of a stripe of M lines of the first frame, where M is a vertical dimension of said vicinity of the pixels.

10. A video processor, comprising:
  a first computation module for computing first matching energies for individual local displacements between frames of the video sequence using a first window around a pixel;
  a first minimization module for determining a minimum of the first matching energies;
  a second computation module for computing second matching energies, each second matching energy being function of a set of a plurality of local displacements between frames of the video sequence using the first window around said pixel;
  a comparison module for verifying a comparison criterion between the second matching energies and the minimum of the first matching energies;
  a third computation module for computing third matching energies for individual local displacements of a group of local displacements between frames of the video sequence using a second window around said pixel if at least one set in said sets provides a second matching energy satisfying the comparison criterion with the minimum of the first matching energies, the second window being smaller than the first window, the group of local displacements being based on local displacements of said at least one set in said sets;
  an output for associating with said pixel a local displacement providing the minimum of the first matching energies if none of the second matching energies satisfies the comparison criterion with the minimum of the first matching energies and for associating with said pixel a local displacement of said group for which the third matching energy is minimal if at least one of the second matching energies satisfies the comparison criterion with the minimum of the first matching energies.

11. The video processor as claimed in claim 10, wherein said group of local displacements includes the local displacements of at least one set in said sets satisfying the comparison criterion with the minimum of the first matching energies and displacements satisfying proximity conditions with the local displacements of said at least one set in said sets.

12. The video processor as claimed in claim 10, further comprising a frame level analyzer operating after having associated respective local displacements with pixels of a first frame to provide the sets for processing pixels of a second frame following the first frame.

13. The video processor as claimed in claim 12, wherein the frame level analyzer comprises:
  memory space for containing a two-dimensional histogram for pairs of displacements of a set of candidate displacements and, for each one of a plurality of pixels of the first frame, a respective one-dimensional histogram indicating how many times each displacement of the candidate set was associated with other pixels located in a vicinity of said one of the plurality of pixels;
  a module for computing the respective one-dimensional histogram for each of said plurality of pixels of the first frame;
  a module for selecting two displacements for which the respective one-dimensional histogram indicates the largest numbers;

a module for updating a value of the two-dimensional histogram for the pair of displacements corresponding to the two selected displacements; and
  a module for selecting pairs of displacements of the candidate set to define respective sets, whereby the selected pairs provide the largest values of the two-dimensional histogram.

14. The video processor as claimed in claim 13, wherein the updating of the value of the two-dimensional histogram for the pair of displacements corresponding to the two selected displacements for a pixel comprises incrementing said value of the two-dimensional histogram by an amount, wherein the amount is zero if at least one of said largest numbers indicated in the one-dimensional histogram for said pixel is below a predefined value or if the two displacements of said pair are within a predefined distance from each other.

15. The video processor as claimed in claim 13, wherein the frame level analyzer handles the pixels in a raster order and the memory space allocated to the one-dimensional histograms is for pixels of a stripe of M lines of the first frame, where M is a vertical dimension of said vicinity of the pixels.

* * * * *